Sept. 29, 1953  A. C. PETERSON  2,653,673
MOTOR AND DRIVE TRANSMISSION ARRANGEMENT BETWEEN
AXIALLY ALIGNED VEHICLE DRIVING WHEELS
Filed Jan. 11, 1950  4 Sheets-Sheet 1
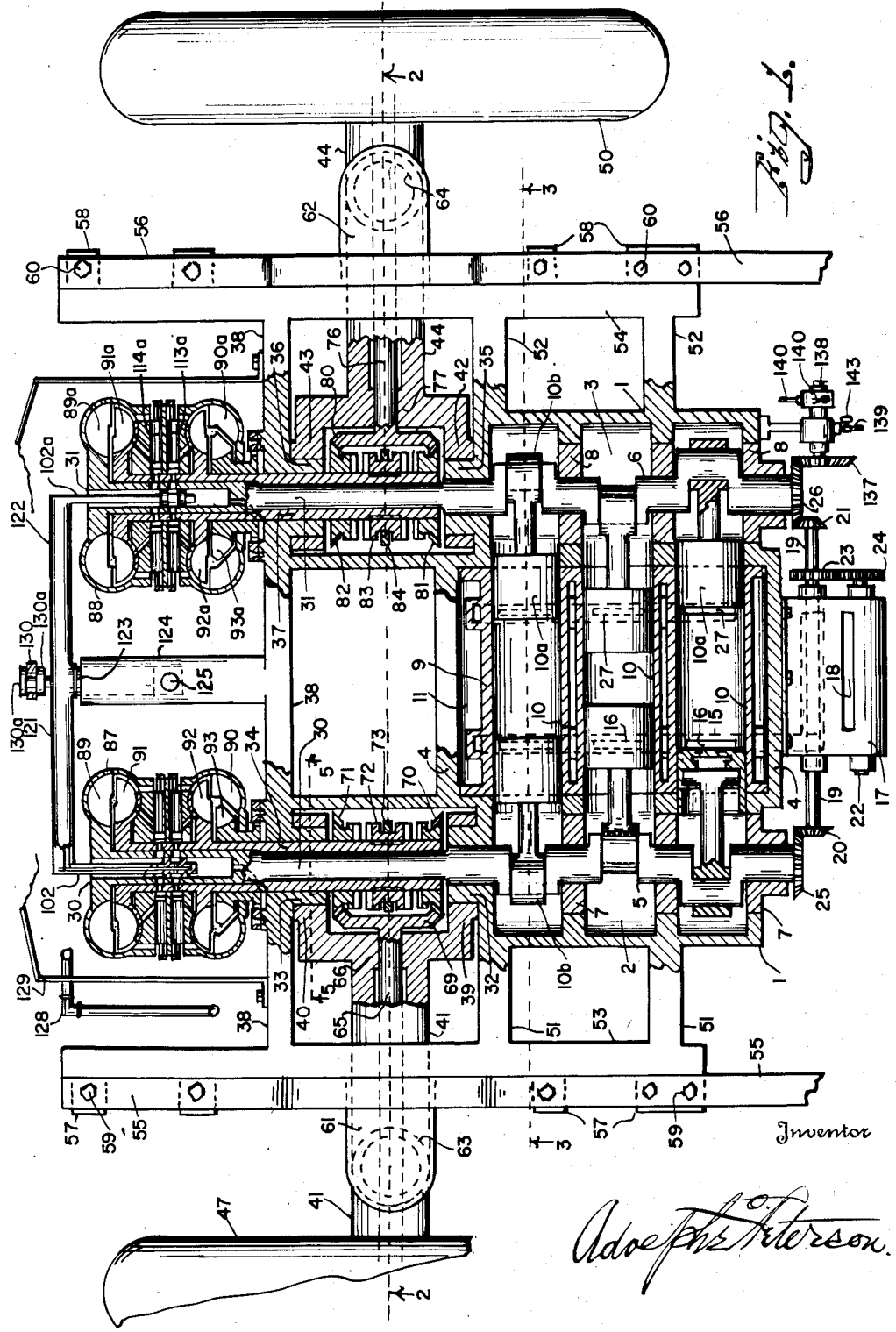
Inventor
Adolph C. Peterson.

Sept. 29, 1953 A. C. PETERSON 2,653,673
MOTOR AND DRIVE TRANSMISSION ARRANGEMENT BETWEEN
AXIALLY ALIGNED VEHICLE DRIVING WHEELS
Filed Jan. 11, 1950 4 Sheets-Sheet 2
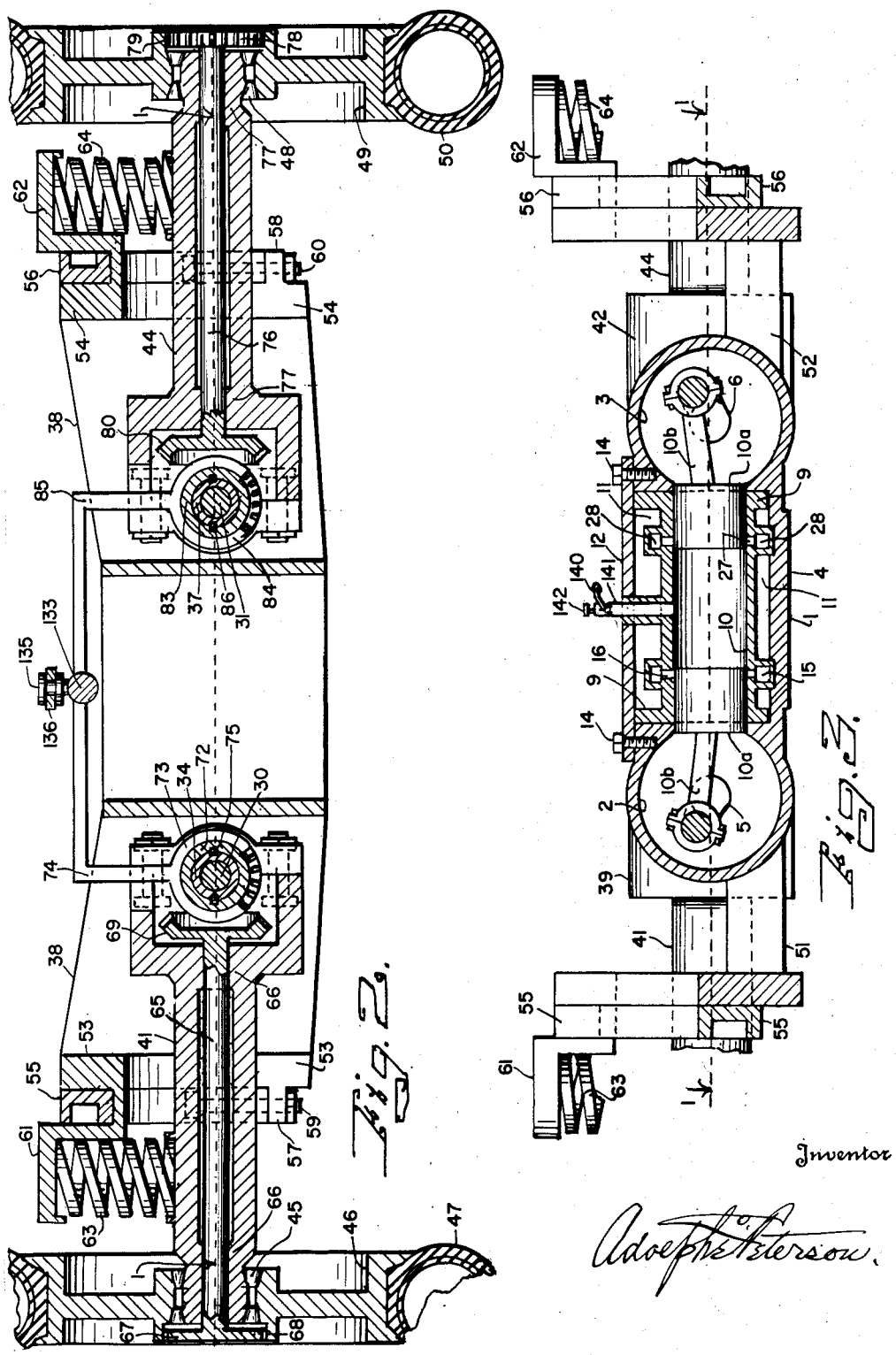
Inventor
Adolph C. Peterson

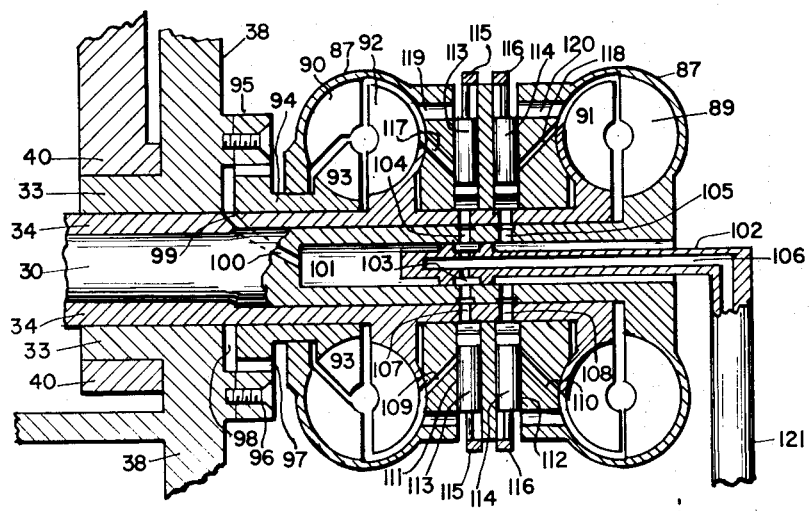

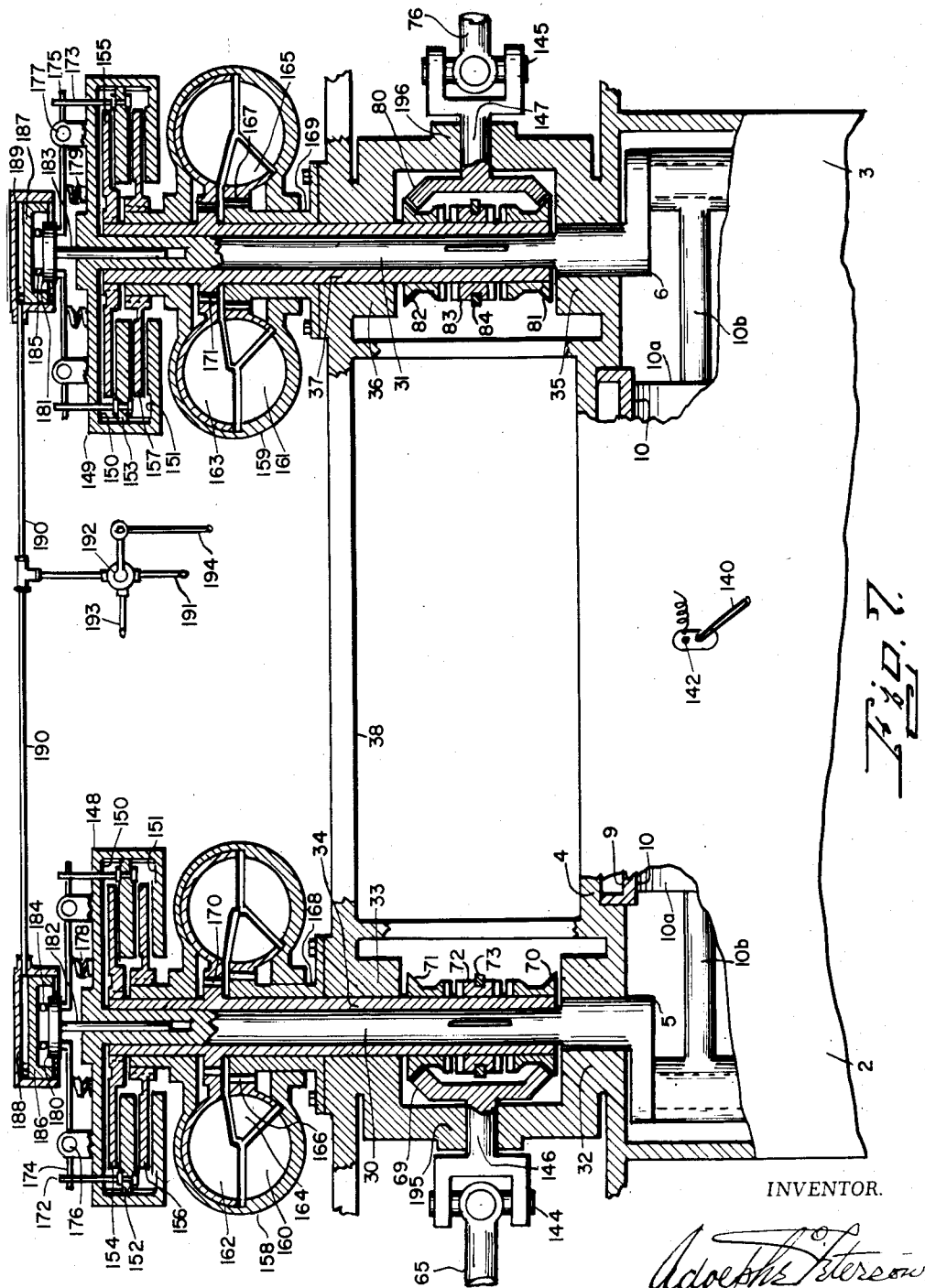

Patented Sept. 29, 1953

2,653,673

UNITED STATES PATENT OFFICE 2,653,673

MOTOR AND DRIVE TRANSMISSION ARRANGEMENT BETWEEN AXIALLY ALIGNED VEHICLE DRIVING WHEELS

Adolphe C. Peterson, Edina, Minn.

Application January 11, 1950, Serial No. 137,904

5 Claims. (Cl. 180—58)

My invention relates to means for power application in automotive drive means wherefore it is called Motor and Drive Transmission Arrangement Between Axially Aligned Vehicle Driving Wheels.

The principal objects of my invention are to provide a means for the application of driving power from an engine to road wheels in an automobile, which means shall be more simple in its construction, cheaper in its manufacture, cheaper in maintenance than such means for this purpose, as are generally used. A chief object is to provide such a means in a form which is compact in its construction, and which occupies relatively little space in its application in an automobile construction. A chief object is to provide such an application of the driving power in an automotive construction, as will eliminate from the construction, a considerable number of the parts which are usually found in an automobile construction, and which will therefore result in an improved construction. An object is to enable use in an engine and drive construction of the opposed piston operation which has been found in other applications to provide simplicity and economy in its use, and to therefore provide its advantages in automotive construction, without great complication, but with rather a reduction in the complication in engine and driving means. In general the object is to improve upon automotive engine and driving means for such means, as automobiles, trucks, tractors, buses, or other automotive means.

The principal devices and combinations of devices, comprising my invention, are as hereinafter described and as defined in the claims. In the accompanying drawings which illustrate my invention in several different forms, like characters refer to like parts throughout the views in so far as practicable. Referring to the drawings:

Figure 1 is a view chiefly in horizontal section on a plane passing through the axes of the principal operating elements of my device, some parts being shown in full plan view, some parts being broken away, the section being on the lines 1—1 of Figures 2 and 5, and 3.

Figure 2 is a section on a vertical plane passing through the axes of the wheel propeller shafts and the road wheels, this section being on the lines 2—2 of Figures 1 and 6, some parts being shown in full side elevation and some parts being broken away.

Figure 3 is a vertical section on the lines 3—3 of Figures 1 and 6, some parts being shown in full side elevation and some parts being broken away.

Figure 4 is a section similar to that of Figure 1 but showing only one of the fluid clutching means in enlarged scale, some associated adjacent parts of the device being shown broken away, and some parts being shown in full plan view. The other clutching means is similar.

Figure 5 is a detail view in vertical section on the line 5—5 of Figure 1, this view showing only one of the bearing mountings of one road wheel mounting means.

Figure 6 is a view in horizontal plane of the device as applied to an automotive chassis, at the rear end or one end of the chassis, this view being on a scale only about one-half that of the views, Figures 1, 2, 3, 5.

Figure 7 is a view in horizontal section through the axes of the principal operating elements of a modified form of my device, this view being similar to that of Figure 1, but showing only a part of the engine, and showing a modified form of the driving connection between device and the road wheels, and a modified form of the clutching means, this view being on a somewhat larger scale than that of Figure 1, the driving shafts to the road wheels being broken away and the road wheels not being shown.

Referring first to Figures 1 to 6, both inclusive, the numeral 1 indicates an engine casing and crank case construction, which has two crank sections 2 and 3, respectively, each placed in the same horizontal plane, the crank sections being united by an intermediate section denoted 4. The crank sections 2 and 3 are so formed that crank shafts 5 and 6, respectively, are mounted in them, parallel to each other and placed longitudinally of the chassis of the automobile in which they are placed, the crank shaft 5 being mounted in bearing elements 7 and the crank shaft 6 being mounted in bearing elements 8. The crank shafts 5 and 6 rotate in the horizontal plane and rotate on axes parallel to each other and placed longitudinally of the chassis.

The intermediate section 4 is so formed that it forms a deep well wherein there is placed a cylinder unit or casting 9 and this casting is formed to have three cylinders formed or bored therein, the cylinders having their axes, all in the horizontal plane wherein are also the axes of the two crank shafts 5 and 6. The axes of the cylinders (each denoted 10) lie in the said plane and extend transversely of the chassis of the automotive construction with which it is associated. The cylinders 10 are each open at both ends. They have cooling spaces 11 outside of the cylinder casting 9 between it and the wall of the intermediate section 4 of the casing construction 1. A cover plate 12 is bolted over the well within which the cylinder casting 9 is placed and serves to securely hold the cylinder casting 9 in its place, and serves also to complete the enclosure of the cooling spaces 11 so that cooling water or liquid may be circulated therein by any means, not shown, as in any engine construction. Conduit connections 13, Figure 6, serve as means for circulation of such cooling liquid between the spaces 11 and any liquid cooling means, not shown. Bolts 14 secure the cover plate 12 in place.

The cylinder casting 9 has an air manifold 15 formed therein and this serves to deliver charging air through inlet ports 16, of each cylinder 10, the charging air being delivered at a pressure of say ten pounds or thereabouts, above atmospheric pressure, from the air blower 17 which may be of a Rootes type or any type which will deliver the requisite charges of fresh air. The blower 17 receives fresh air by means of air port 18 and has one shaft 19 which extends between the mitre gears 20, 21, and has another shaft 22 which is driven by means of the small spur gears 23 and 24, one of these being fixed on the shaft 19 which serves not only to drive the blower 17 but also serves as a synchronizing shaft between the crank shafts 5 and 6, one of the mitre gears 20, 21, being in gear with the mitre gear 25 on crank shaft 5 and the other mitre gear 20, 21, being in gear with the mitre gear 26 on the crank shaft 6. Mitre gears 25 and 26 are on the front ends of crank shafts 5 and 6. The cylinder casting 9 has formed in its walls ports 27, in each cylinder 10 in its side wall, and all of these exhaust ports 27 deliver exhaust gases into an exhaust manifold 28 which delivers to atmosphere at 29.

The crank shafts 5 and 6 are extended or have secured rotatively with them to rotate on the same axes with them, one with each, primary transmission shafts, 30 and 31, respectively, one axially in alignment with crank shaft 5 and the other axially in alignment with crank shaft 6, and each of these shafts extends rearwardly from the engine casing construction 1, a sufficient distance so that there may be mounted axially on them the means hereafter described.

The primary transmission shaft 30 extends axially through a pair of axle bearing elements 32 and 33, respectively, there being, however, intermediately of the primary transmission shaft 30 and axle bearing 33, a secondary shaft 34 which is a tubular shaft extending over the shaft 30 and co-axial therewith. The primary transmission shaft 31 extends axially through a pair of axle bearing elements 35 and 36, respectively, there being, however, intermediately of the primary shaft 31 and axle bearing 36, a secondary shaft 37, which is a tubular shaft extending over the shaft 31 and co-axial therewith. The axle bearing elements 32 and 33 are axially in alignment longitudinally of the chassis and laterally removed from the central plane vertically of the chassis. The axle bearing elements 35 and 36 are axially in alignment longitudinally of the chassis and laterally removed from the central plane vertically of the chassis, but on the other side of that plane.

The axle bearing elements 32 and 33 are fixed to or formed respectively in the engine casting 1 and the transverse fixture 38. The axle bearing elements 35 and 36 are fixed to or formed, respectively, in the engine casting 1 and the transverse fixture 38. The pair of axle bearings 32 and 33 have oscillably mounted on them the two bearing arms 39 and 40, respectively of a semi-axle 41. The pair of axle bearings 35 and 36 have oscillably mounted on them the two bearing arms 42 and 43, respectively of a semi-axle 44. The semi-axle 41 extends laterally away toward one side of the chassis, as shown in Figures 1 and 2, and has rotatively mounted thereon, at its end, by means of roller bearings 45, a road wheel 46 which has a pneumatic tire 47 mounted thereon. The semi-axle 44 extends laterally away toward the other side of the chassis, as shown in Figures 1 and 2, and has rotatively mounted thereon, at its end, by means of roller bearings 48, a road wheel 49 which has a pneumatic tire 50 mounted thereon. The semi-axles 41 and 44 lie in the same plane vertically of the chassis and transversely of the chassis and the outer ends of each may move substantially vertically in that plane vertically of the chassis and transversely of the chassis. The semi-axles 41 and 44 are of sufficient length, that there is only a slight movement out of the vertical plane of the road wheels attached, but so that there are several inches of movement in the vertical plane, transversely of the chassis. The pneumatic tires mounted on the road wheels have sufficient flexibility that this movement is permitted. In lieu of the type of wheel mounting shown any other means may be adopted.

The engine casing and crank case construction 1 has formed integrally with it or firmly attached to it, side arms or brackets 51 extending laterally on one side, and has side arms or brackets 52 extending laterally on the other side. The arms 51 are formed with or united with a side member 53, the latter being also formed with or united with the near end of the transverse fixture 38. The side arms 52 are formed with or united with a side member 54, the latter being also formed with or united with the near end of the transverse fixture 38. The transverse fixture 38, together with arms 51 and 52 and members 53 and 54 form a somewhat rectangular frame, horizontally located, which supports the engine and crank case construction 1, and also supports the automobile chassis side rails or frame members 55 and 56, to thereby support the associated automobile body (not shown) for which the chassis is used, at its rear end or one end. The opposite or front end of the chassis is not shown, but may be of any type such as customarily used.

The side members 53 and 54 have laterally extending brackets 57 and 58, respectively, which have bolts 59—60 placed through them and the chassis rails 55—56. The side members 53 and 54 also have spring brackets 61 and 62, respectively, formed with them, and coil springs 63, 64, respectively, are placed between the brackets and the upper sides of the semi-axles 41 and 44, respectively, whereby, the engine and casing construction 1 and the chassis rails 55—56, are yieldably supported on the semi-axles 41—44 and thereby on the road-wheels 46—49.

The road wheel 46 is driven by propeller shaft 65 which is rotatably mounted in bearings 66 in semi-axle 41 and has at its outer end an attached spur gear or dog-clutch 67 which fully engages an internal gear 68 in road wheel 46. The inner end of propeller shaft 65 has fixed thereon or formed therewith a mitre gear 69 which is always in engagement with two mitre driving gears 70 on the one side and 71 on the other side. The two mitre gears 70 and 71 are rotatably mounted on the associated tubular shaft or secondary shaft 34, but float thereon and are not engaged with the secondary shaft 34, except when the intermediary double ended dog-clutch 72 is moved either way axially of the tubular shaft 34, by the bifurcated end 73 of lever 74. The dog-clutch 72 is by means of sliding key-means 75, permanently in rotative engagement with tubular shaft, secondary shaft 34.

The road wheel 49 is driven by propeller shaft 76 which is rotatably mounted in bearings 77 in semi-axle 44 and has at its outer end an attached spur gear or dog-clutch 78 which fully engages an internal gear 79 in road wheel 49. The inner end of propeller shaft 76 has fixed thereon or formed therewith a mitre gear 80 which is always in engagement with two mitre driving gears 81 on the one side and 82 on the other side. The two mitre gears 81 and 82 are rotatably mounted on the associated tubular or secondary shaft 37, but float thereon and are not engaged with the secondary shaft 37, except when the intermediary double ended dog-clutch 83 is moved either way axially of the secondary shaft 37, by the bifurcated end 84 of lever 85. The dog-clutch 83 is by means of sliding key-means 86, permanently in rotative engagement with tubular shaft or secondary shaft 37.

The secondary shafts 34 and 37 are each extended rearwardly of the transverse fixture 38 and its bearings and the primary shafts which are there internally of the secondary shafts, are extended so as to pass completely through the secondary shafts 34 and 37, respectively, so that the primary shaft 30 may have formed thereon or fixed in any manner thereon, the fluid clutch casing member 87, and so that the primary shaft 31 may have formed thereon or fixed in any manner thereon, the fluid clutch casing member 88.

The fluid clutch member 87 has formed therein a clutch impeller 89 and at the opposite end the converter impeller 90. The former drives secondary shaft 34 through runner or vane member 91 and the latter drives secondary shaft 34 through runner or vane member 92. Between the converter impeller 90 and its associated runner 92 there is placed the reaction vane member 93, and the latter is formed or fixed on the short tubular shaft 94 which extends outwardly of the clutch casing and is statically fixed to transverse fixture member 38 by flange 95 and bolts 96 so that reaction member 93 is static. Apertures 97 in flange 95 permit flow of liquid under some conditions through them from space 98 and thereby from ports 99 in secondary shaft and port 100 in primary shaft 30 and internal space 101. The internal space 101, which is tubular or cylindrical and formed in shaft 30, has slidable therein the valve member 102 which is cylindrical in form and permits rotation of the primary shaft 30 on it. The valve member 102 is slidable axially of the primary shaft 30 to bring its annular port 103 into juxtaposition with ports 104 in the one position and ports 105 in the alternative position of the valve. Ports 104 and 105 are formed in the side wall of the primary shaft 30 and permit flow from the conduit 106 formed in valve 102, through port 103, then through either port 104 or port 105 into the port 107 or 108, alternatively, and thereby into annular space 109 or 110 and thereby to either the small control cylinders 111 or 112, wherein are slidable radially of casing 87 the small control pistons 113 or 114, respectively. Ports 107 and 108 are in secondary shaft 34 and annular spaces 109 and 110 and cylinders 111 and 112 are formed in the material of the fluid clutch casing 87. The pistons 113 and 114 are normally held inwardly radially by means of yieldable leaf springs 115, and 116, respectively. Control pistons 113 and 114, respectively cover fluid delivery ports 117 and 118, the former delivering to the converter and the latter delivering to the fluid clutch, in their normal inward positions, and in those positions, they uncover discharge ports 119 and 120, respectively. Conversely, in their outward positions, they open the delivery ports and discharge ports 119 or 120 are covered. The pistons 113 and 114 act conversely in this, however, with respect to their associated ports. Thus under pressure of discharge of liquid through the valve member 102 from conduit 106, the pistons 113 or 114 in the cylinders to which the discharge is made, will be moved outwardly by that pressure, and will thereby open either of the delivery ports and close the associated discharge ports, which ports are associated with the converter or with the fluid clutch. The other control pistons, that is 113 or 114, will remain inward and the opposite condition will prevail in the means related to them.

The clutch casing member 88 has formed therein clutch impeller 89$^a$, converter impeller 90$^a$, runner or vane member 91$^a$, runner or vane member 92$^a$, reaction vane member 93$^a$, control pistons 113$^a$ and 114$^a$, and ports as described in connection with the clutch casing member 87, and a control valve member 102$^a$, similar to valve member 102. The clutch casing member 87 with its parts is more particularly illustrated, on an enlarged scale, in Fig. 4. The clutch casing member 88 with its parts is identical with that shown in Figure 4, and therefore is not again shown on enlarged scale and is not further described, except to state that its parts are like those of the unit illustrated in Figure 4, and that its elements are designated by similar numerals but with the letter $a$ added. Conduit 106$^a$ (not seen) is in 102$^a$ likewise.

The conduits 106 and 106$^a$, respectively are connected by right-angled conduits or sections 121, 122, respectively, with one conduit 123 which is slidable horizontally in cylinder 124 and receives liquid by way of cylinder 124 from a liquid conduit 125, and the latter receives liquid, as oil, from a pump unit 126, whenever the latter is driven by electric motor 127 to draw liquid oil from supply conduit 128 and deliver it by means of conduit 123, 121, 122, 106, 106$^a$ to the fluid clutches of clutch casings 87, 88, in the one position of valves 102, 102$^a$, or to the converters of clutch casings 87, 88, in the alternative positions of valves 102, 102$^a$. The supply conduit 128 may receive oil from any source of supply, as the bottom of the enclosing pan or shield 129, which substantially encloses the clutches.

The conduits 123, 121, 122, 106, 106$^a$, are movable as a unit to place valve members 102, 102$^a$, in either of their alternative positions for control, the valve members being formed with conduits 106 and 106$^a$, respectively. The control unit is moved by means of a fulcrumed lever 130, pivotably mounted at 131, and having attached to its upper end the near end of a control rod 132, the latter extending forwardly toward the front end of the automobile chassis, so that it may be moved in either direction, for control, by the operator. The lever 130, is shown from above, in Fig. 6, but it should be understood to be of such length, that it will have the adequate movement at its lower end to perform the function indicated, and lower end moves, freely, between collars 130ᵃ. The runners or vane members 91 and 92 of casing 87 and 91ᵃ and 92ᵃ of casing member 88, are connected, the former pair to secondary shaft 34, and the latter pair to secondary shaft 37, so that runners 91, 92, which are the driven members, will drive secondary shaft 34, and the runners 91ᵃ and 92ᵃ, which likewise are driven members, will drive secondary shaft 37. Driving torque, thus imparted to the secondary shafts 34 and 37, which is in opposite directions of rotation, will be transmitted through either the two forward mitre gears 70 and 81, respectively, if the double ended dog-clutches 72—83, are moved to their forward positions, or through the two rear mitre gears 71 and 82, respectively, if the double ended dog-clutches 72—83 are moved into their rearward clutching positions, that is, with respect to the mitre gears. In the one position, of the dog-clutches 72 and 83, the larger mitre gears 69 and 80, of propeller shafts 65 and 76, will be driven in the direction for forward driving, that is the same direction, and in the alternative positions, the larger mitre gears 69 and 80, of propeller shafts 65 and 76, will be driven in the direction for rearward travel of the automobile chassis, that is in the same direction. The road-wheels 46 and 49, will correspondingly be driven in the directions for forward and rearward travel.

The double ended dog-clutches 72 and 83 are moved in unison, either forwardly or rearwardly of the chassis, by means of their associated levers 74 and 85, and these are given that movement in unison by the one slidable rod 133, slidable in mounting 134, and the rod 133 by its affixed post 135, and the control rod 136 mounted thereon by its near end. The control rod 136 is extended forwardly of the chassis to any location where it will be convenient to the operator for control, so that the operator thereby secures the control necessary for forward travel, or reverse travel of the automobile chassis.

One of the engine crank shafts by means of mitre gear 137 drives the shaft 138 of a pump and distributor means which draws liquid fuel from supply conduit 139 (from any source), and discharges it by way of conduits 140, one for each engine cylinder, to the individually associated fuel injection nozzles 141, of which there are three, each discharging, in accordance with the combustion cycle of the engine means, into one of the engine cylinders 10, of which three are shown. The engine may have any type of spark ignition means, diagrammatically shown as 142, one for each cylinder, although it may operate on a diesel cycle. It may have any type of electric or other starting means, this not being shown, as it may be of any of the well known types.

The double ended dog-clutches 72 and 83 may be placed in the neutral positions, whereby the engine is free of any retarding restraint and may be started in this condition. When the engine is started in operation, the blower 17 will draw atmospheric air and deliver it to the engine cylinders 10 through the ports described. The operator may by any fuel control means 143 control the fuel supply. To start the automobile, the operator increases fuel supply to the engine fuel injection nozzles, and places the conduits 106, 106ᵃ and the valve members 102—102ᵃ in position, preferably for the converter drive through the converter runners to the secondary shafts 34 and 37, and he thereupon or previously, places dog-clutches 72—83 in the direction for forward travel, or conversely in the direction for reverse travel, and if he then further increases the engine power by the fuel supply, the engine crank shafts will drive through primary shafts 30 and 31, respectively, to secondary shafts 34 and 37, by means of the fluid converter drives in casings 87—88. This drive will be at multiplied torque by the torque converting means in casings 87—88, and travel speed will increase. When sufficient speed has been attained, he may convert the drive to the more direct or efficient fluid clutch means in casings 87—88, and thereupon the drive will be from the primary shafts 30—31 through the fluid clutching means described to the secondary shafts. In either drive the secondary shafts will drive through the selected mitre gears 70—81, or 71—82, and thereby to the larger mitre gears 69 and 80, and thereby through propeller shafts 65 and 76, respectively to the road wheels 46—49. In the driving over uneven ground the semi-axles, may have oscillation through a few degrees on the axis of the bearings therefor, which is the same as the axes of the primary shafts 30 and 31. Through the medium of the converter or fluid clutches this oscillation is readily absorbed without transmission to the engine crank shafts.

Referring now to the modified form of my device shown in Figure 7, this figure shows especially a different mounting of the road wheel propeller shafts. In this form the propeller shafts 65 and 76, respectively, are by universal joints 144 and 145, flexibly connected with short drive shafts 146 and 147, respectively, and the latter are attached or formed integrally with mitre gears 69 and 80, one to each mitre gear. The latter are in permanent engagement with the two pairs of mitre driving gears 70—71 and 81—82, respectively, as in the first form described. The last named pairs of mitre gears are engaged for forward or reverse driving, by the double ended dog-clutches 72 and 83, respectively, and the latter are controlled by lever means as in the first form, whereby the dog-clutches 72—83 may be moved forwardly or rearwardly in unison. The semi-axles as shown in the first form, are not in this form mounted on the bearings wherein the primary shafts are mounted, that is they are not shown with any specific mounting means, but in this case there may be any type of semi-axles for supporting the road wheels or any such support means, and this support for the road wheels is not shown. The propeller shafts 65 and 76 of this form may be connected by any means, such as is commonly used, to the road wheels for driving the road wheels, the one propeller shaft 65 driving one road wheel and the other propeller shaft 76 driving the other road wheel, at the other side of the chassis. It should, however, be understood that the propeller shafts 65 and 76 are road wheel driving shafts, each driving one road wheel.

In this form the drive means between the primary shafts 30—31, and the secondary shafts 34—37, is not of the same type, as that shown in the first form. In this form, primary shafts 30—31 respectively, drive fly-wheel members 148—149, and the latter have clutch faces 150, and 151, and intermediate axially movable clutch disks 152, 153, and the latter in one position, engage direct drive disks 154, 155, and in the alternative positions engage the indirect or low speed means through the friction disks 156, 157. Disks 154, 155 are also friction driving disks. In the first named position the drive is direct through the friction drive from each primary shaft 30 and 31, to the secondary shafts 34—37.

In the position for indirect driving, the disks 156, 157 are engaged with the primary shafts 30—31, and the drive is then to the clutch casings 158, 159 with which disks 156, 157 are permanently engaged. The clutch casings 158, 159 have impellors 160, 161, runners 162, 163 and reaction vane means 164, 165. The latter are through one-way clutch means 166, 167 engaged with fixed shafts 168, 169, or disengaged therefrom. The runners 162, 163 through roller one-way clutches 170, 171, will drive secondary shafts 34, 37, respectively, or may be disengaged therefrom in direct driving.

The intermediate disks 152, 153 are moved axially by means of engaging rods 172, 173, and the latter are moved either way by fulcrumed levers 174, 175, fulcrumed on pivots 176, 177, and the inner ends of levers 174, 175 are moved either direction axially, of the primary shafts 30—31, by means of coil springs 178, 179, which move them one-way, and thrust disks 180—181 on rods 182, 183, respectively slidable axially in shafts 30—31. The thrust disks 180—181 are engaged by bearing means 184, 185 between them and pistons 186, 187, the latter being reciprocable axially of primary shafts 30—31, within cylinders 188, 189, to which liquid may flow under pressure to one side of the pistons, by conduits 190 from liquid pressure conduit 191, according to the control exercised by the operator through a control valve 192, which in one position will permit flow from supply conduit 191 to conduits 190 and thereby to cylinders 188, 189 and in the other position will release liquid from conduits 190 to by-pass conduit or release conduit 193. The valve 192 is controlled by means of flexibly attached control rod 194 which is extended to any position forwardly of the chassis for control by the operator. This form of my device has engine cylinders 10 as in the first form wherein pairs of pistons 10$^a$—10$^a$ reciprocate and drive the primary shafts 30—31 in opposite directions. Connecting rods 10$^b$—10$^b$ connect the pistons flexibly with crank shafts 5 and 6. Short shafts 146—147 rotate in fixed bearings 195, 196, respectively. Pistons 10$^a$—10$^a$ are in pairs in the cylinders of the first form and are connected by connecting rods 10$^b$—10$^b$ with crank shafts 5 and 6, respectively. Crank shafts 5 and 6 rotate oppositely in both forms of the device.

I have shown specific devices and combinations of devices but contemplate that other detailed devices and combinations may be used in the realization of my invention, without departing from the spirit and contemplation thereof.

What I claim is:

1. A power transmission means for automotive vehicles, comprising: a pair of road wheels, a pair of propeller shafts each connected with one of the road wheels for driving it and each rotating in a plane substantially in alignment with each other and transversely of the vehicle, a pair of tubular transmission shafts each placed at right angles to said propeller shafts and spaced apart from each other in a horizontal plane, a pair of driving gears on one of said transmission shafts and a pair of driving gears on the other of said transmission shafts, a positive clutching means for the one pair of driving gears and a positive clutching means for the other pair of driving gears each of said positive clutching means providing for clutching either of its associated pair of driving gears to its associated transmission shaft, means in cooperation with each of said propeller shafts for conveying driving torque from either of said driving gears of one of said pairs of driving gears to the propeller shaft, a pair of engine crank shafts each having an extension primary shaft extended through one of said tubular transmission shafts and in axial alignment therewith, a pair of variable ratio torque transmission means having location at one side of the axes of said propeller shafts one transmitting drive from one extension primary shaft to its associated tubular transmission shaft and the other transmitting drive from the other extension primary shaft to its associated tubular transmission shaft, an engine cylinder means having its cylinders disposed transversely of said crank shafts and having location at the side of said axes of said propeller shafts opposite to said first named side, pairs of engine pistons one pair in each engine cylinder, connecting means between one piston of each said pair and one of said crank shafts and connecting means between the other piston of each said pair and the other of said crank shafts.

2. A power transmission means for automotive vehicles, comprising: a pair of road wheels, a pair of propeller shafts each connected with one of the road wheels for driving it and each rotating in a plane substantially in alignment with each other and transversely of the vehicle, a pair of tubular transmission shafts each placed at right angles to said propeller shafts and spaced apart from each other in a horizontal plane, a pair of drive gears one on each of said tubular transmission shafts and a pair of driven gears one on each of said propeller shafts one gear of each pair in engagement with one of the other pair, a pair of engine crank shafts each having an extension primary shaft extended through one of said tubular transmission shafts and in axial alignment therewith, a pair of variable driving hydrokinetic devices having location at one side of the axes of said propeller shafts one of said devices providing drive between one extension primary shaft and its associated tubular transmission shaft and the other of said devices providing drive between the other extension primary shaft and its associated tubular transmission shaft, engine cylinders and associated pistons having location at the side of said axes of said propeller shafts opposite to said first named side, each said engine cylinder having a pair of said pistons reciprocable therein one of each of said pairs of pistons having connection with one of said crank shafts and the other of each of said pairs of pistons having connection with the other of said crank shafts.

3. A power transmission means for automotive vehicles, comprising: a pair of road wheels, a pair of propeller shafts each connected with one of the road wheels for driving it and each rotating in a plane substantially in alignment with each other and transversely of the vehicle, a pair of tubular transmission shafts each placed at right angles to said propeller shafts and spaced apart from each other in a horizontal plane, a pair of driving gears on one of said transmission shafts and a pair of driving gears on the other of said transmission shafts, a positive clutching means for the one pair of driving gears and a positive clutching means for the other pair of driving gears each of said positive clutching means providing for clutching either of its associated pair of driving gears to its associated transmission shaft, means in cooperation with each of said propeller shafts for conveying driving torque from either of said driving gears of one of said pairs of driving gears to the propeller shaft, a pair of primary shafts each extended through one of said tubular transmission shafts, a pair of variable ratio torque transmission means having location at one side of the axes of said propeller shafts transmitting drive from one primary shaft to its associated tubular transmission shaft and the other transmitting drive from the other primary shaft to its associated tubular transmission shaft, an engine means having rotatable driving means in rotatable driving engagement with each of said primary shafts to transmit driving torque thereto, the said engine means and its rotatable driving means having location at the side of the said axes of said propeller shafts opposite to said first named side.

4. A power transmission means for automotive vehicles, comprising: a pair of road wheels, a pair of propeller shafts each connected with one of the road wheels for driving it and each rotating in a plane substantially in alignment with each other and transversely of the vehicle, a pair of tubular transmission shafts each placed at right angles to said propeller shafts and spaced apart from each other, a pair of drive gears one on each of said tubular transmission shafts and a pair of driven gears one on each of said propeller shafts one gear of each pair in engagement with one of the other pair, a pair of primary shafts each extended through one of said tubular transmission shafts, a pair of variable driving hydrokinetic devices having location at one side of the axes of said propeller shafts one of said devices providing drive between one primary shaft and its associated tubular transmission shaft and the other of said devices providing drive between the other primary shaft and its associated tubular transmission shaft, an engine means having rotatable driving means in rotatable driving engagement with each of said primary shafts to transmit driving torque thereto, the said engine means and its rotatable driving means having location at the side of the said axes of said propeller shafts opposite to said first named side.

5. A power transmission means for automotive vehicles, comprising: a pair of road wheels, a pair of propeller shafts each connected with one of the road wheels for driving it and each rotating in a plane substantially in alignment with each other and transversely of the vehicle, a pair of tubular transmission shafts each placed at right angles to said propeller shafts and spaced apart from each other in a horizontal plane, a pair of driving gears on one of said transmission shafts and a pair of driving gears on the other of said transmission shafts, a positive clutching means for the one pair of driving gears and a positive clutching means for the other pair of driving gears each of said positive clutching means providing for clutching either of its associated pair of driving gears to its associated transmission shaft, means in cooperation with each of said propeller shafts for conveying driving torque from either of the driving gears of one of said pairs of driving gears to the propeller shaft, a pair of primary transmission elements each extended through one of said tubular transmission shafts and variable and yieldable drive means between each of said primary transmission elements and one of said tubular transmission shafts, engine means to convey driving torque to each of said primary transmission elements, the said pair of variable and yieldable drive means having location on the one side of the axes of said propeller shafts and said engine means having location on the other side of the axes of said propeller shafts.

ADOLPHE C. PETERSON.

References Cited in the file of this patent

UNITED STATES PATENTS

| Number | Name | Date |
| --- | --- | --- |
| 1,254,057 | Moore | Jan. 22, 1918 |
| 1,654,924 | Douglas | Jan. 3, 1928 |
| 2,255,773 | Heftler | Sept. 16, 1941 |
| 2,328,141 | Haltenberger | Aug. 31, 1943 |
| 2,347,444 | Vincent | Apr. 25, 1944 |
| 2,448,345 | Aronson | Aug. 31, 1948 |